United States Patent Office 3,558,745
Patented Jan. 26, 1971

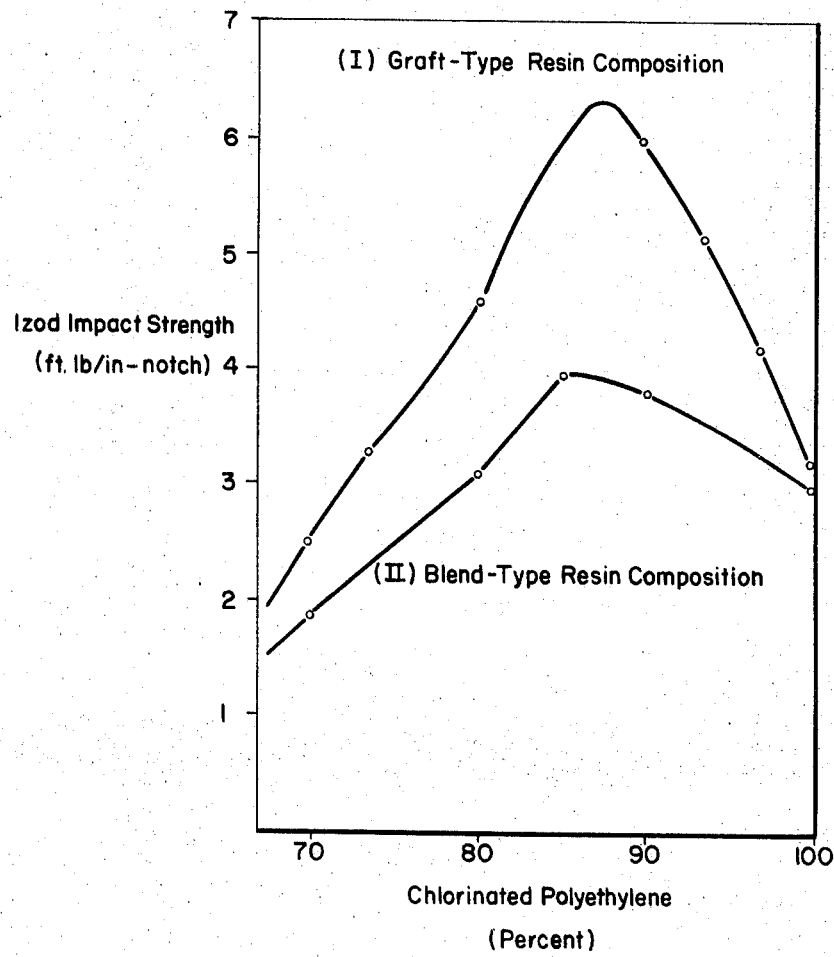

3,558,745
THERMO-PLASTIC RESIN COMPOSITIONS
Masao Ogawa and Shigeo Hayashi, Tokyo, Japan, assignors to Showa Denko Kabushiki Kaisha, Tokyo, Japan
Filed Jan. 4, 1968, Ser. No. 695,659
Claims priority, application Japan, Jan. 20, 1967, 42/3,634
Int. Cl. C08f 19/18, 29/24
U.S. Cl. 260—876
20 Claims

ABSTRACT OF THE DISCLOSURE

A thermoplastic resin composition comprising (a) a ternary system resin prepared by graft polymerizing from 2 to 17% by weight of a mixture of an acrylonitrile monomer and a styrene monomer to from 83 to 98% by weight of chlorinated polyethylene and (b) a vinyl chloride resin.

BACKGROUND OF THE INVENTION

Field of the invention

The present invention relates generally to a thermoplastic resin composition having improved properties and more particularly to (a) a thermo-plastic resin composition comprising a ternary system resin prepared by graft polymerizing a mixture of an acrylonitrile monomer and a styrene monomer to chlorinated polyethylene and (b) a vinyl chloride resin.

Description of the prior art

It has hitherto been known to endow elasticity to a vinyl chloride resin by incorporating chlorinated polyethylene into the resin (cf.; Japanese Pat. 277,836). In such a manner, the impact resistance of vinyl chloride may be improved to some extent but, on the other hand, the high tensile strength, hardness and heat distortion temperature thereof, which are merits of polyvinyl chloride, are decreased.

Further, a thermo-plastic resin composition has been known wherein a ternary system resin composition prepared by polymerizing a mixture of an acrylonitrile monomer and a styrene monomer with chlorinated polyethylene is mixed with a vinyl chloride resin (cf.; Japanese Pat. 447,253). In the known thermo-plastic resin composition the ternary system resin composition employed is prepared by reacting 20–90 parts by weight of a mixture of an acrylonitrile monomer and a styrene monomer (hereinafter the mixture is simply called "AS" throughout this specification) with 10–80 parts by weight of chlorinated polyethylene (hereinafter the polyethylene is simply called "CPE" throughout the specification), that is a ternary system resin composition having an AS/CPE ratio of 20–90%/10–80% is used.

SUMMARY OF THE INVENTION

The inventors have found that by compounding a ternary system resin having a specific ratio of AS to CPE other than the aforesaid range in a vinyl chloride resin (hereinafter, the resin is simply called PVC), all the properties thereof can be improved as compared with the aforesaid known resin composition. In addition, an unexpectedly good result is obtained in regard to the impact resistance, and the resin composition is also endowed with particularly good threadability. The novel composition of the invention is prepared by graft polymerizing from about 2–20% by weight of a mixture of an acrylonitrile monomer and a styrene monomer (AS) to from about 80–98% by weight of chlorinated polyethylene (CPE).

The thermo-plastic resin composition of the present invention thus comprises (a) a ternary system resin prepared by graft polymerizing from 2% by weight to 20% by weight of a mixture of an acrylonitrile monomer and a styrene monomer to from 80% by weight to 98% by weight of chlorinated polyethylene and (b) a vinyl chloride resin.

The foregoing thermo-plastic resin composition of this invention is endowed with all the desirable properties required in this type of resin composition, such as, high impact resistance, good weatherability, a high heat distortion temperature, hardness, and also improved high temperature processability and threadability. In particular, the advantages of the thermo-plastic resin composition of the present invention are characterized by extremely high impact resistance and excellent processability, as compared with those of other similar resin compositions.

The features of the resin compositions of the present invention will now be explained below in detail.

DESCRIPTION OF THE PREFERRED EMBODIMENTS

First of all, the thermo-plastic resin of this invention has a very excellent impact resistance.

It has hitherto been known, as mentioned above, that the impact resistance of a vinyl chloride resin can be improved by incorporating therein a ternary copolymer of AS and CPE, but when the content of the CPE component in the ternary copolymer resin is increased (in accordance to the present invention) over the 80% by weight CPE conventionally employed, the impact resistance of the final vinyl chloride resin-containing thermoplastic resin composition can be further increased. The increase of the impact resistance is proportional to the increase in the amount of the CPE component, but it has unexpectedly been found there in a maximum point in the relationship. The best impact resistance is obtained by adding the copolymer obtained by graft polymerizing the components in the AS/CPE ratio of about 15/85. This result is in opposition to conventional concepts that only CPE components having rubbery properties contribute to improving the impact resistance, and hence this is quite unexpected.

By mixing a conventional copolymer of acrylonitrile, styrene and chlorinated polyethylene with a vinyl chloride resin (instead of mixing the resin prepared by graft polymerizing AS to CPE as in this invention) the advantages above mentioned cannot be obtained. In other words, the impact resistance of the vinyl chloride resin compositon of this invention having incorporated therein a graft type resin of AS and CPE is much higher than that of a vinyl chloride resin composition in which a blend-type resin of an AS copolymer and CPE is utilized. Moreover, with the present invention, not only is the impact resistance improved, but a homogeneous composition having no uneven qualities can be obtained. This can be confirmed by the fact that when the composition of this invention is injection molded, the impact resistance of test piece at the gate side of the injection molding is almost same as that of the test piece at the further side from the gate of the injection molding whereas, there are extreme variations in impact resistance in the case of injection molding a conventional resin composition containing the aforesaid blend-type resin.

The advantages of the thermo-plastic resin composition of the present invention with respect to impact resistance will be further explained with reference to the accompanying drawing, and by an examination of the results of Izod impact testing.

The resin composition (I) of this invention, in which 90 parts by weight of a vinyl chloride resin has been blended with 10 parts by weight of the graft type resin of AS and CPE, and a similar resin composition (II), in which a vinyl chloride resin has been blended with a ternary blend-type resin of an AS copolymer and CPE in the same component ratio as in the above resin composition of this invention, are prepared by injection molding. For these resin compositions, the Izod impact strength is plotted in ft. lb./in.-notch against the percentage of the CPE content in the resin. The accompanying graph represents the results of this comparison. As clearly shown in the graph, the resin composition of the present invention has a maximum impact resistance near the point where the content of CPE component is about 86%. In addition, the shock resistance is about 50% higher than that of composition (II).

An Izod impact test was conducted utilizing test pieces of graft-type resin composition (I) and blend-type resin composition (II) recovered at the gate side and the outlet side of an injection mold. The results are as follows:

|  | (I) | (II), ft. lb./ in.-notch |
|---|---|---|
| Gate | 6.0 | 5.3 |
| Outlet | 6.3 | 2.9 |

It is clear from the results that the resin composition of this invention has very homogeneous qualities in kneading by means of working machines, such as an extruding machine or an injection molding machine.

Secondly, the resin composition of the present invention has good threadability. This has never been shown in conventional similar resin compositions. Threadability is also called "tapping property," and basically this defines a property concerning the workability of the resin when a tapped hole is formed in the resin, and the degree of abrasion of the resin when a screw is repeatedly inserted and withdrawn in or from the tapped hole. It is desirable that the torque at threading be large, and that the deformation or abrasion of the tapped hole or groove by repeated screwing be small. Such properties are very important for resin articles in which screws are used, such as, furniture, building materials, electric articles, and the like.

In a conventional resin composition consisting of PVC and CPE, the torque at threading is small, and in a ternary resin composition consisting of the aforesaid binary system and AS, the torque is increased as the content of AS is increased, but if the content of AS is too large, the resin becomes hard and brittle, which results in reducing the repeated threadability and deforming and abrading the holes or grooves for screws. The optimum range in the graft type ternary system occurs when the ratio of AS/CPE is 17–5/83–95.

The results of a torque determination are shown in the following table, in which the expression AS–g–CPE (which is also used hereafter in the specification) stands for a graft type composition of AS and CPE.

TABLE

| PVC | CPE | AS-g-CPE (AS/CPE) | Maximum torque, kg. cm. | Repeated 6 kg. cm. torque, pull up (times) |
|---|---|---|---|---|
| 85 | 15 |  | 8–9 | 70 |
| 85 * |  | 15   5/95 | 10–13 | 75 |
| 85 * |  | 15  15/85 | 13–16 | 80 |
| 85 |  | 15  20/70 | 14–16 | 60 |
| 85 |  | 15  30/70 | 15–18 | 50 |

* Examples of the present invention.

The test method utilized was as follows: a hole having a 2.4 mm. diameter was formed in a sample piece (a square pillar) ½ inch x ½ inch x 5 inch utilizing a drill. A definite screw was screwed in the hole by means of a torque driver, whereby the maximum torque was measured. Thereafter, the screwing procedure in the same section under a constant load was repeated, whereby powders twisted off by the screwing procedure may be observed slipping out of the screw. This was caused by the defacement of the hole.

The resin composition of this invention also has good processability. When kneading a composition consisting of a known vinyl chloride resin and CPE by means of standard fabricating machines, such as an extruding machine or an injection molding machine, if the molecular weight of CPE is large, the kneading resistance is large, and hence generation of heat results, which tends to cause thermal degradation of the resin. To prevent the occurrence of such problems, a lubricant such as a stearate is usually employed. The addition of large amounts of the lubricant may improve the molding stability, but this generally has a bad influence on the impact resistance of the product.

On the other hand, when compounding an AS–CPE graft polymer as in the present invention, the aforesaid degradation phenomenon does not occur, and the product maintains good fluidity.

For example, when a conventional resin composition consisting of 85 parts by weight of PVC and 15 parts by weight of CPE (Cl:30%) was kneaded at 200° C. and 30 r.p.m., the spiral flow, kneading steady torque, and degradation time thereof were 25 cm., 13 kg.-m., and 18 min. respectively, whereas those of the resin composition of the present invention consisting of 85 parts by weight of PVC and 15 parts by weight of AS–g–CPE (CPE 85% and AS 15%) were 29 cm., 10 kg.-m., and 26 min. respectively.

The resin composition of the present invention has, in particular, excellent processability at high temperatures. The following table shows a comparison of the resin composition of this invention with a known CPE-compounded resin composition with respect to elongation and tensile strength, both of which are fundamental properties for estimating processability.

| | Composition | | Elongation (percent) | | | | Tensile strength (kg./cm.²) | | | |
|---|---|---|---|---|---|---|---|---|---|---|
| | PVC | CPE-g-AS | 90° C. | 100° C. | 120° C. | 140° C. | 90° C. | 100° C. | 120° C. | 140° C. |
| Invention | 80 | 17-3 | 140 | 180 | 230 | 330 | 95 | 85 | 42 | 25 |
| Control | 80 | ¹15 | 150 | 180 | 160 | 100 | 86 | 75 | 30 | 13 |
| Do | 70 | ¹30 | 100 | 140 | 140 | 90 | 52 | 32 | 14 | 9 |

¹ Only CPE (not CPE-g-AS).
NOTE.—Test conditions: ASTM type S dumb-bell; tensile speed: 10 cm./min.

As shown in the above table, differences in the properties of both compositions increase as the temperature increases from 100° C. to 120° C., and finally to 140° C. at which temperatures the differences in properties reach above 1.5 times or about 3 times, respectively. This shows that the resin composition of the present invention can be easily and effectively molded by molding techniques such as blow molding or vacuum molding.

The resin composition of the present invention is also excellent in other properties, such as dimensional stability, tensile strength, oil resistance, weatherability and the like. For instance, an oil resistance test was conducted by immersing the resin composition of this invention in ASTM #3 oil for 24 hours at 70° C., and the result was compared with that of a conventional resin composition (control). The results are shown in the following table.

| | Composition | | Absorbed oil (wt. percent) |
|---|---|---|---|
| | PVC | CPE-g-AS | |
| Invention | 80 | 17-3 | 75 |
| Do | 70 | 24-6 | 78 |
| Control | 80 | ¹20 | 105 |

¹ Only CPE (not CPE-g-AS).

It is clear from the results shown in the above table, that the amount of oil absorbed by the resin composition of this invention is much lower than that absorbed by the control resin composition.

In a resin composition prepared by mixing only chlorinated polyethylene with polyvinyl chloride, if the molecular weight of the chlorinated polyethylene is large, (e.g., the molecular weight of polyethylene, a raw material for the chlorinated polyethylene is higher than 100,000), the shear strength of the resin composition at screw kneading in an extruding machine or an injection molding machine will become large enough to generate heat and cause degradation of the resin as well as resulting in yellowing and flow marks in the molded product. However, by incorporating the acrylonitrile-styrene grafted copolymer according to the present invention the aforesaid problems are removed, and a molded article having a good surface luster can be obtained. Also shrinkage of the resin composition of this invention at molding is less, that is, the resin composition has good dimensional stability.

For testing the dimensional stability of the resin composition, it was molded using a metal mold 90 x 90 x 3 mm.$^3$ at 60° C. to form a plate having a thickness of 3 mm. The area of the plate thus formed was measured at 20° C., the result of which was compared with that of a control sample. These results are shown in the following table.

| | Composition | | Measured area of moldings (at 20° C.) |
|---|---|---|---|
| | PVC | CPE-g-AS | |
| Invention | 80 | 17-3 | 89.9×89.9 mm.$^2$ |
| Control | 80 | $^1$ 20 | 89.6×89.7 mm.$^2$ |

$^1$ Only CPE.

The resin composition of the present invention may be prepared by the method shown below.

The polyvinyl chloride, which is one ingredient of the resin composition of the present invention is preferably hard polyvinyl chloride having a polymerization degree of 500–2,500, preferably, 700–1,500. But it may be a copolymer of vinyl chloride, or one obtained by post-chlorinating polyvinyl chloride. If it is desired to provide the resin composition with some flexibility there may be used a vinyl chloride copolymer prepared by the copolymerization of vinyl chloride and, for example, less than 15% of vinyl acetate or other vinylic monomers. If it is desired to improve the chemical and flame resistance of the resin composition, there may be used a copolymer of vinyl chloride and vinylidene chloride or a resin prepared by chlorinating polyvinyl chloride. Accordingly, polyvinyl chloride in the present invention includes not only a single polymer of vinyl chloride, but also the above-mentioned vinyl chloride-series resins.

The AS-CPE graft polymer which is the other ingredient of the resin composition of the present invention may be prepared by graft polymerizing a mixture of acrylonitrile monomer and styrene monomer in a mixing ratio of from 1–99 to 99–1%, preferably from 20–30% to 80–70% by weight to CPE in such proportion that the weight ratio of AS/CPE is 2–20/80–98 in weight percent.

As the chlorinated polyethylene (CPE), another raw material of the graft polymer, there may be employed a chlorinated polyethylene prepared by chlorinating polyethylene as well as chlorosulfonated polyethylene (e.g., "Hypalon" a trade name by du Pont de Nemours & Co.) prepared by chlorosulfonating polyethylene. Further, as the polyethylene to be chlorinated or chlorosulfonated, there may be used a high-density polyethylene and a low-density polyethylene, as well as an ethylenic copolymer such as an ethylene-butene-1 copolymer or an ethylene-propylene copolymer. Thus, hereinafter all of the aforesaid chlorinated polyethylene or ethylene copolymers and chlorosulfonated polyethylene or ethylene copolymers are called simply chlorinated polyethylene in this specification. The most desirable chlorinated polyethylene is either a chlorinated polyethylene, a chlorinated ethylene-butene-1 copolymer or a chlorinated ethylene-propylene copolymer, each containing 15–50% by weight, preferably, 20–45% by weight of chlorine.

When employing polyethylene as a raw material for CPE, it is preferable to use a polyethylene having a molecular weight of about 150,000–250,000 (high load melt index 1.0–5.0 g./10 min. measured at a 21.6 kg. load, a 190° C. temperature and at a 2 mm. x 8 mm. 1 diameter of nozzle). By using a polyethylene having a molecular weight in the aforesaid range, chlorination in an aqueous suspension reaction system can be easily conducted, and dispersibility and the power of improving properties when blending with PVC are excellent.

The graft polymerization of AS and CPE may be conducted in the presence of a solvent such as chloroform, carbon tetrachloride, dichloroethane, trichloroethane, chlorobenzene, toluene, and benzene or a mixture thereof; or in a non-solvent by using a polymerization initiator such as benzoyl peroxide, azobisisobutylonitrile, or lauroyl peroxide; or by using ultraviolet rays; or radioactive rays while using, if necessary, an emulsifying agent; or may be conducted in an aqueous suspension.

The proportion of the aforesaid AS-CPE graft polymer to the vinyl chloride resin for providing a resin composition having the desired properties is 99–1 part by weight of the vinyl chloride resin to 1–99 parts by weight of the AS-g-CPE resin. For obtaining a resin composition having high hardness and good impact resistance, a range of 99–70 parts by weight of the vinyl chloride resin to 1–30 parts by weight of the AS-g-CPE polymer is preferable. For obtaining a resin composition having good tensile strength, a range of 95–90 parts by weight of the vinyl chloride to 5–10 parts by weight of the AS-g-CPE polymer is preferable. For obtaining a resin composition having primarily excellent impact resistance, a range of 90–80 parts by weight of the vinyl chloride resin to 10–20 parts by weight of the AS-g-CPE polymer is preferable.

In order to mix the two components for obtaining the resin composition of the present invention, standard procedures may be employed to uniformly mix the two components. For example, they may be mixed uniformly by means of a hot roll, a Banbury mixer, an extruding machine, or in any manner wherein the solutions, emulsions or suspensions of the two components are mixed together. Then, solvent may be removed from the system in order to provide uniformly mixed powders of the two components.

The resin composition of the present invention may be suitably utilized for providing plates, pipes, waved plates, vessels, sheets, films and various other moldings.

The resin composition of this invention will be further explained together with the features thereof by the following example.

EXAMPLE

[All parts by weight]

| Composition | (a) | (b) | (c) |
|---|---|---|---|
| Chlorinated polyethylene (chlorination degree 31%) | 85 | 81 | 90 |
| Acrylonitrile | 3 | 4 | 2 |
| Styrene | 12 | 15 | 8 |
| Water | 300 | 300 | 300 |
| Lauroyl peroxide | 0.15 | 0.2 | 0.1 |
| Polyvinyl alcohol | 0.4 | 0.4 | 0.4 |

The amounts of chlorinated polyethylene, acrylonitrile monomer, styrene monomer, lauroyl peroxide (catalyst), polyvinyl alcohol (dispersing agent), and water, as shown in the above table, were charged in an autoclave and the reaction was conducted for 2 hours at 75° C. and for 1 hour at 145° C. under a nitrogen atmosphere to provide a graft type resin. Yield was 98%.

The three kinds of graft type resins (a), (b) and (c) (having different AS/CPE ratios) were each blended with polyvinyl chloride (PVC) and their properties were measured. The results are shown in the following table, in which the properties of a conventional resin prepared by blending PVC with CPE are shown for comparative purposes.

Test Method: The components were dry-blended by means of a Henchel type mixer while increasing the temperature up to 110° C. using 4 phr. of a mixture of 1:1 by weight of dibasic lead phosphite and tribasic lead sulfate as a stabilizer, and 0.5 phr. of a mixture of barium stearate and cadmium stearate as a lubricant. From the composition thus prepared, a test piece ½ inch x ½ inch x 5 inches was molded by means of a five ounce, screw, inline injection molding machine. The molding conditions were: 190° C.—molding temperature, 50 kg./cm.$^2$—injection pressure, and 60° C. metallic mold temperature.

|  | Control | | | | Invention | | | | |
| --- | --- | --- | --- | --- | --- | --- | --- | --- | --- |
|  | 1 | 2 | 3 | 4 | 1 | 2 | 3 | 4 | 5 |
| PVC | 100 | 90 | 85 | 80 | 90 | 85 | 80 | 85 | 85 |
| CPE |  | 10 | 15 | 20 |  |  |  |  |  |
| (a) |  |  |  |  | 10 | 15 | 20 |  |  |
| (b) |  |  |  |  |  |  |  | 15 |  |
| (c) |  |  |  |  |  |  |  |  | 15 |
| Izod impact strength $^1$ (in notched) | 0.6 | 2.3 | 6.0 | 11.2 | 6.0 | 10.1 | 14.3 | 6.5 | 7.5 |
| Tensile strength $^2$ | 607 | 492 | 403 | 511 | 511 | 429 | 380 | 435 | 410 |

$^1$ Ft. lb./in.
$^2$ Kg./cm.$^2$.

While the invention has been particularly shown and described with reference to preferred embodiments thereof, it will be understood by those skilled in the art that various changes in form and details may be made therein without departing from the spirit and scope of the invention.

What is claimed is:
1. A thermo-plastic resin composition comprising:
   (a) from 1 to 99 parts of a ternary system resin prepared by graft polymerizing from 2 to 17% by weight of a mixture of from 1 to 99% of an acrylonitrile monomer and from 99% to 1% of a styrene monomer onto from 83% to 98% of a member selected from the group consisting of chlorinated polyethylene, a chlorinated ethylene-butene-1 copolymer, a chlorosulfonated polyethylene and a chlorinated ethylene-propylene copolymer, and
   (b) from 99 to 1 part of a vinyl chloride resin.
2. The thermo-plastic resin composition as claimed in claim 1 wherein said graft polymerization is conducted in the presence of a catalyst.
3. The thermo-plastic resin composition as claimed in claim 2 wherein said catalyst is lauroyl peroxide.
4. The thermo-plastic resin composition as claimed in claim 1 wherein said graft polymerization is conducted under the irradiation by ultraviolet rays or radioactive rays.
5. The thermo-plastic resin composition as claimed in claim 1 wherein said graft polymerization is conducted in an aqueous suspension system.
6. The thermo-plastic resin composition as claimed in claim 1 wherein said chlorinated polyethylene contains from 15-50% by weight chlorine.
7. The thermo-plastic resin composition as claimed in claim 1 wherein said vinyl chloride resin is polyvinyl chloride having a polymerization degree of from 500 to 2,500.
8. The thermo-plastic resin composition as claimed in claim 1 wherein said vinyl chloride resin is selected from the group consisting of polyvinyl chloride, a chlorinated polyvinyl chloride and a vinyl chloride copolymer.
9. The thermo-plastic resin composition as claimed in claim 8 wherein said vinyl chloride copolymer is selected from the group consisting of a copolymer of vinyl chloride and vinyl acetate and a copolymer of vinyl chloride and vinylidene chloride.
10. A thermo-plastic resin composition as claimed in claim 9 wherein the amount of monomer copolymerized with said vinyl chloride is less than 15%.
11. The thermo-plastic resin composition as claimed in claim 1 wherein said composition is prepared by mixing the two components (a) and (b) in a dry step.
12. The thermo-plastic resin composition as claimed in claim 1 wherein said composition is prepared by mixing the two components (a) and (b) in a wet system followed by drying.
13. The thermo-plastic resin composition as claimed in claim 1 wherein the ratio of said acrylonitrile monomer and said styrene monomer to said chlorinated polyethylene is from 17–5 to 83–95.
14. The thermo-plastic resin composition as claimed in claim 13 wherein said ratio is about 15/85.
15. The thermo-plastic resin composition as claimed in claim 1 which consists essentially of elements (a) and (b).
16. The thermo-plastic resin composition of claim 1 wherein the mixture of said acrylonitrile monomer and said styrene monomer comprise from 20 to 30% acrylonitrile and from 80 to 70% styrene.
17. The resin composition of claim 1 comprising 1–30 parts of (a) and 99–70 parts of (b).
18. The resin composition of claim 1 comprising 5–10 parts (a) and 95–90 parts (b).
19. The resin composition of claim 1 comprising 10–20 parts (a) and 90–80 parts (b).
20. The resin composition of claim 1 wherein the member from said group is one of said copolymers containing 15–50% chlorine.

References Cited

UNITED STATES PATENTS

| 2,646,417 | 7/1953 | Jennings | 260—897C |
| 3,149,183 | 9/1964 | Salyer et al. | 260—897C |

FOREIGN PATENTS

| 447,253 | 5/1965 | Japan. |

MURRAY TILLMAN, Primary Examiner

H. ROBERTS, Assistant Examiner

U.S. Cl. X.R.

204—159.17; 260—29.6, 878